(12) United States Patent
Choe et al.

(10) Patent No.: US 11,122,235 B2
(45) Date of Patent: Sep. 14, 2021

(54) DISPLAY DEVICE AND CONTROL METHOD THEREFOR

(71) Applicant: SAMSUNG ELECTRONICS CO., LTD., Suwon-si (KR)

(72) Inventors: Won-hee Choe, Seoul (KR); Min-woo Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/541,222

(22) PCT Filed: Dec. 3, 2015

(86) PCT No.: PCT/KR2015/013123
§ 371 (c)(1),
(2) Date: Jun. 30, 2017

(87) PCT Pub. No.: WO2016/108445
PCT Pub. Date: Jul. 7, 2016

(65) Prior Publication Data
US 2017/0353689 A1    Dec. 7, 2017

(30) Foreign Application Priority Data
Dec. 30, 2014   (KR) .................... 10-2014-0193729

(51) Int. Cl.
*H04N 5/58* (2006.01)
*G09G 5/00* (2006.01)
*H04N 5/14* (2006.01)

(52) U.S. Cl.
CPC ............... *H04N 5/58* (2013.01); *G09G 5/003* (2013.01); *H04N 5/14* (2013.01);
(Continued)

(58) Field of Classification Search
CPC ............ G09G 2360/144; G09G 5/003; G09G 2330/022; G09G 2320/0626;
(Continued)

(56) References Cited

U.S. PATENT DOCUMENTS 7,567,245 B2   7/2009 Mamata
8,358,273 B2   1/2013 Hodge et al.
(Continued)

FOREIGN PATENT DOCUMENTS

CN   101191978 A   6/2008
CN   101959073 A   1/2011
(Continued)

OTHER PUBLICATIONS

International Search Report, issued by International Searching Authority in corresponding International Application No. PCT/KR2015/013123, dated Mar. 17, 2016. (PCT/ISA/210).
(Continued)

*Primary Examiner* — John W Miller
*Assistant Examiner* — Sihar A Karwan
(74) *Attorney, Agent, or Firm* — Sughrue Mion, PLLC (57) ABSTRACT

A display device is provided. The display device includes a display configured to display at least one of an image and a text; a sensing unit configured to sense ambient illuminance; and a processor configured to gradually increase an output luminance value of the display, if a specific condition is satisfied based on the ambient illuminance sensed by the sensing unit and display attributes.

10 Claims, 12 Drawing Sheets

(52) U.S. Cl.
CPC ............... *G09G 2320/0626* (2013.01); *G09G 2330/022* (2013.01); *G09G 2360/144* (2013.01)

(58) Field of Classification Search
CPC .......... G09G 3/3208; G09G 3/36; G09G 3/20; G09G 3/2044; G09G 5/10; H04N 5/58; H04N 5/14
USPC ........................................................ 345/207
See application file for complete search history.

(56) References Cited

U.S. PATENT DOCUMENTS

| | | | |
|---|---|---|---|
| 8,384,654 B2 | 2/2013 | Fujine et al. | |
| 8,416,254 B2 | 4/2013 | Kim et al. | |
| 8,686,981 B2 | 4/2014 | Barnhoefer et al. | |
| 8,884,939 B2 | 11/2014 | Barnhoefer et al. | |
| 8,913,194 B2 | 12/2014 | Kim et al. | |
| 9,119,261 B2 | 8/2015 | Barnhoefer et al. | |
| 2004/0223007 A1 | 11/2004 | Mamata | |
| 2007/0159478 A1 | 7/2007 | Choi et al. | |
| 2008/0284719 A1* | 11/2008 | Yoshida | G02F 1/136209 345/102 |
| 2010/0214275 A1* | 8/2010 | Chiou | G09G 3/36 345/207 |
| 2012/0019152 A1 | 1/2012 | Barnhoefer et al. | |
| 2012/0019492 A1 | 1/2012 | Barnhoefer et al. | |
| 2012/0019493 A1 | 1/2012 | Barnhoefer et al. | |
| 2013/0093803 A1 | 4/2013 | Saitoh | |
| 2014/0021868 A1* | 1/2014 | Cho | G09G 3/3406 315/158 |
| 2014/0098992 A1* | 4/2014 | Yagi | G06K 9/00348 382/103 |

FOREIGN PATENT DOCUMENTS

| | | |
|---|---|---|
| CN | 102959613 A | 3/2013 |
| CN | 103325355 A | 9/2013 |
| CN | 103886840 A | 6/2014 |
| JP | 2008-39857 A | 2/2008 |
| JP | 2009-109876 A | 5/2009 |
| JP | 2014-71507 A | 4/2014 |
| KR | 10-2006-0034780 A | 4/2006 |
| KR | 10-0677958 B1 | 2/2007 |
| KR | 10-2007-0056560 A | 6/2007 |
| KR | 10-2007-0074394 A | 7/2007 |
| KR | 10-0755682 B1 | 9/2007 |
| KR | 10-0763239 B1 | 10/2007 |
| KR | 10-0808170 B1 | 2/2008 |
| KR | 10-2008-0059447 A | 6/2008 |
| KR | 10-2008-0083744 A | 9/2008 |
| KR | 10-2009-0024719 A | 3/2009 |
| KR | 10-2009-0076033 A | 7/2009 |
| KR | 10-2010-0043418 A | 4/2010 |
| KR | 10-2012-0023529 A | 3/2012 |
| KR | 10-2013-0063324 A | 6/2013 |

OTHER PUBLICATIONS

Written Opinion, issued by International Searching Authority in corresponding International Application No. PCT/KR2015/013123, dated Mar. 17, 2016, (PCT/ISA/237).
Communication dated Dec. 25, 2018, issued by the State Intellectual Property Office of P.R. China in counterpart Chinese Application No. 201580074168.X.
Communication dated Sep. 19, 2019 issued by the Korean Intellectual Property Office in counterpart Korean Patent Application No. 10-2014-0193729.
Communication dated Sep. 19, 2019 issued by the State Intellectual Property Office of P.R. China in counterpart Chinese Patent Application No. 201580074168.X.
Communication dated Feb. 3, 2020 issued by the State Intellectual Property Office of P.R. China in counterpart Chinese Patent Application No. 201580074168.X.
Communication dated Feb. 11, 2020, issued by the Korean Intellectual Property Office in counterpart Korean Patent Application No. 10-2014-0193729.
Communication dated Aug. 4, 2020 issued by the Korean Intellectual Property Office in Korean Patent Application No. 10-2014-0193729.
Communication dated Aug. 5, 2020 issued by the China National Intellectual Property Administration Chinese Patent Application No. 201580074168.X.
Communication dated Jan. 7, 2021 by the China National Intellectual Property Administration in Chinese Application No. 201580074168.X.

* cited by examiner

DISPLAY DEVICE AND CONTROL METHOD THEREFOR

TECHNICAL FIELD

Apparatuses and methods consistent with the present disclosure relate to a display device and a control method thereof, and more particularly, to a display device that supports an ambient illuminance sensing function and a control method thereof.

BACKGROUND ART

In accordance with a development of an electronic technology, various types of electronic devices have been developed and spread. Particularly, display devices such as a mobile device and a TV, which are most widely used, have been rapidly developed in recent years.

As smartphones and tablet devices are spread, a usage time of a mobile display device is increased, and a visual fatigue is increased accordingly.

In particular, a usage time of the mobile display device in a nighttime and/or low illuminance environment is increased. However, if the mobile display device is displayed from a sleep state (or an OFF state) to a bright screen when being used in the nighttime or dark environment, there is a problem in that a glariness phenomenon may occur or an eye may be fatigued according to a sudden change in luminance.

DISCLOSURE

Technical Problem

The present disclosure provides a display device capable of preventing a glariness phenomenon by an output luminance value of a display in consideration of an ambient illuminance as well as display attributes of contents, and a control method thereof.

Technical Solution

According to an aspect of the present disclosure, a display device includes a display configured to display at least one of an image and a text; a sensing unit configured to sense ambient illuminance; and a processor configured to gradually increase an output luminance value of the display, if a specific condition is satisfied based on the ambient illuminance sensed by the sensing unit and display attributes.

The specific condition may be at least one of a case in which the output luminance value of the display is higher than the ambient illuminance and a case in which the display is changed from an inactive state to an active state.

The display attributes may include at least one of a driving brightness of the display and attribute information of at least one of the image and the text.

The attribute information of the at least one of the image and the text may include at least one of color information of the at least one of the image and the text, brightness information of the at least one of the image and the text, and an arrangement state of objects configuring the at least one of the image and the text.

The brightness information of the at least one of the image and the text may include at least one of luminance of at least one object configuring the at least one of the image and the text, an area of the object, and a luminance difference between the object and an adjacent object.

The at least one object may be an object having a maximum luminance value among the objects included in the screen.

The processor may adjust the output luminance value of the display in a gradually increased form over time based on at least one of a predetermined mathematical time function, a brightness value stored in a lookup table (LUT), intensity synthesizing the contents and an image which is darker than the contents, and a memory value recorded previously in a device driver IC.

The output luminance value of the display may include at least one of a maximum brightness value, a maximum color value, and an average brightness value of the contents.

The processor may determine a luminance adjustment factor based on the ambient illuminance sensed by the sensing unit and the display attributes, and adjust the output luminance value of the display in a gradually increased form over time based on the determined factor.

The processor may determine at least one of a starting luminance value, a targeting luminance value and a luminance variation time based on the sensed ambient illuminance and the display attributes, and may gradually increase the output luminance value of the display from the starting luminance value to the targeting luminance value during the luminance variation time.

The processor may provide a user interface (UI) screen for adjusting the output luminance value of the display according to the predetermined event onto one region of the display.

According to another aspect of the present disclosure, a control method of a display device includes sensing ambient illuminance; and adjusting an output luminance value of the display in a gradually increased form, if a specific condition is satisfied based on the sensed ambient illuminance and display attributes indicating at least one of an image and a text.

The specific condition may be at least one of a case in which the output luminance value of the display is higher than the ambient illuminance and a case in which the display is changed from an inactive state to an active state.

The display attributes may include at least one of a driving brightness of the display and attribute information of at least one of the image and the text.

The attribute information of the at least one of the image and the text may include at least one of color information of the at least one of the image and the text, brightness information of the at least one of the image and the text, and an arrangement state of objects configuring the at least one of the image and the text.

The brightness information of the at least one of the image and the text may include at least one of luminance of at least one object included in the screen displaying the contents, an area of the object, and a luminance difference between the object and an adjacent object.

The at least one object may be an object having a maximum luminance value among the objects included in the screen.

In the adjusting of the output luminance value, the output luminance value of the display may be adjusted in a gradually increased form over time based on at least one of a predetermined mathematical time function, a brightness value stored in a lookup table (LUT), intensity synthesizing the contents and an image which is darker than the contents, and a memory value recorded previously in a device driver IC.

The output luminance value of the display may include at least one of a maximum brightness value, a maximum color value, and an average brightness value of the contents.

In the adjusting of the output luminance value, a luminance adjustment factor may be determined based on the sensed ambient illuminance and the display attributes, and the output luminance value of the display may be gradually increased over time based on the determined factor.

Advantageous Effects

As described above, according to the diverse exemplary embodiments of the present disclosure, when the mobile device is used in the nighttime or dark environment, it is possible to prevent the glariness phenomenon.

BEST MODE

Hereinafter, the present disclosure will be described in detail with reference to the accompanying drawings.

Figure 1A:
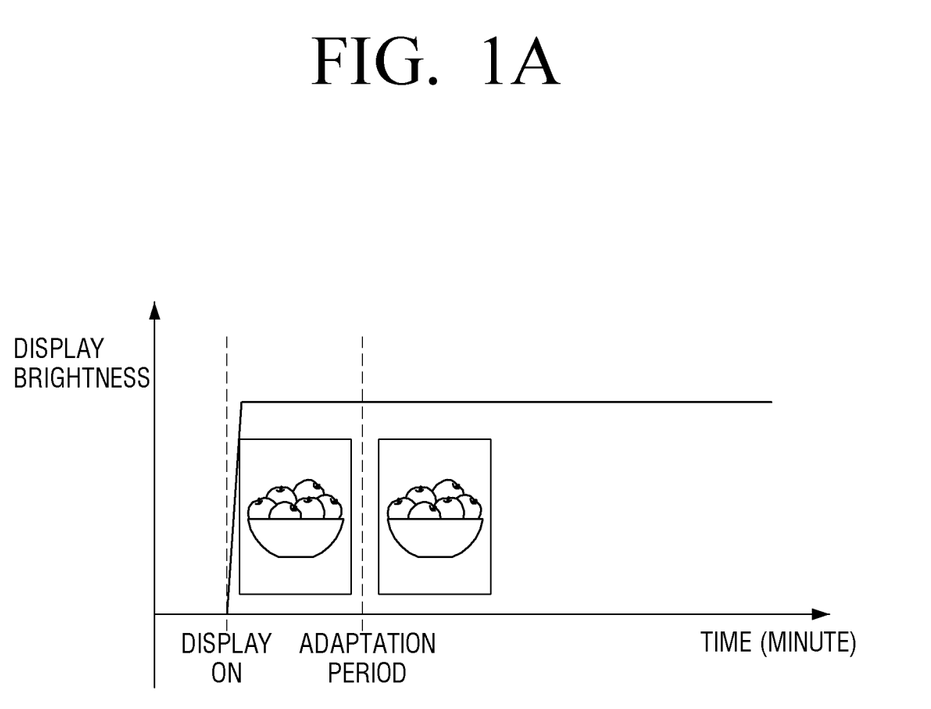
FIGS. 1A and 1B are diagrams illustrating an implementation example a display device according to an exemplary embodiment of the present disclosure.
Figure 1B:
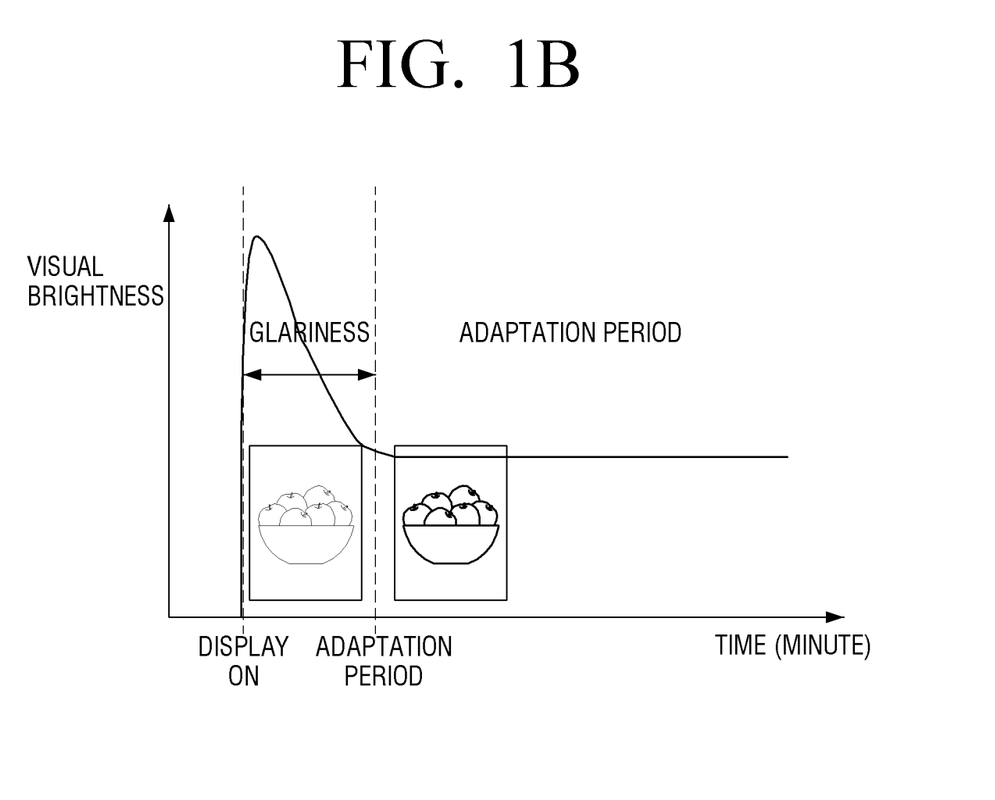

FIG. 1 is a diagram illustrating an implementation example a display device according to an exemplary embodiment of the present disclosure.

The display device 100 may be implemented as a cellular phone such as a smartphone, but is not limited thereto, and may be applicable to any device having a display function such as a tablet PC, a smart watch, a PMP, a PDA, a notebook PC, a TV, or the like.

The display device 100 may be implemented to include various forms of displays such as a liquid crystal display, an organic light-emitting diode, a liquid crystal on silicon (LCoS), a digital light processing (DLP), and the like in order to provide the display function.

Such a high luminance display module may produce bright light that has a bad influence on an eye of a user according to the user, and in particular, as illustrated in FIG. 1A, if the display device is displayed from a sleep state (or an OFF state) to a bright screen when being used in a nighttime or dark environment, a glariness phenomenon occurs or an eye is fatigued according to a sudden change in luminance, as illustrated in FIG. 1B.

Accordingly, the display device 100 according to an exemplary embodiment of the present disclosure may adjust brightness of the display and provide the adjusted brightness to reduce the glariness phenomenon in a specific environment, and hereinafter, diverse exemplary embodiments of the present disclosure will be described in detail with reference to the accompanying drawings for convenience of explanation.

Figure 2A:
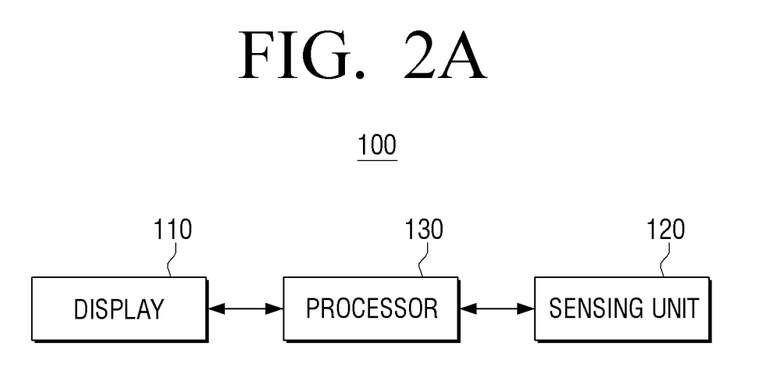
FIG. 2A is a block diagram illustrating a configuration of a display device according to an exemplary embodiment of the present disclosure.

FIG. 2A is a block diagram illustrating a configuration of a display device according to an exemplary embodiment of the present disclosure.

Referring to FIG. 2A, the display device 100 includes a display 110, a sensing unit 120, and a processor 130.

The display 110 may provide various contents screen which may be provided through the display device 100. For example, the contents screen may include various contents such as an image, a moving image, a text, music, and the like, an application execution screen including the various contents, a graphic user interface (GUI) screen, and the like.

Meanwhile, the display 110 may be implemented in various forms of displays such as a liquid crystal display, an organic light-emitting diode, a liquid crystal on silicon (LCoS), a digital light processing (DLP), and the like as described above.

Meanwhile, the display 110 may be implemented in a touch screen form that forms a mutual layer structure with a touch pad, and in this case, the display 110 may be used as a user interface in addition to an output device.

The sensing unit 120 senses an ambient illuminance.

To this end, the sensing unit 120 may be implemented as an illuminance sensor. In this case, the illuminance sensor may use various photocells, but may also use a phototube to measure very low illuminance. For example, a CDS illuminance sensor may be included in the display device 100 to sense illuminance for bi-directions. In this case, the illuminance sensor may also be installed on at least one region which is predetermined on both surfaces of the display device 100, but may also be installed on each pixel unit of both surfaces of the display device 100. For example, it is also possible to measure an illuminance state for each region or each pixel by installing the illuminance sensor having an enlarged form so that a CMOS sensor corresponds to a size of the display 110.

For example, a CDS illuminance sensor 111 senses light around the display device 100, and an A/D converter may convert a voltage obtained by the CDS illuminance sensor into a digital value and transmit the digital value to the processor 130.

The processor 130 controls an overall operation of the display device 100.

If the processor 130 satisfies specific conditions based on the ambient illuminance sensed by the sensing unit 120 and display attributes, the processor 130 adjusts an output luminance value of the display 110 in a gradually increased form.

Here, a predetermined condition may be at least one of a case in which the output luminance value of the display is higher than the ambient illuminance, and a case in which the display 110 is changed from inactive state to an active state. In this case, the inactive state may be a state in which a screen is turned off or screen luminance is lower than a predetermined threshold, such as a screen off state, a standby state, or the like. For example, the inactive state may correspond to a case in which the ambient environment of the display is suddenly changed from a bright environment to a specific illuminance (e.g., 100 lux) or less, a case in which the display is changed from the dark screen to the bright screen in the specific illuminance or less, and the like.

Also, in this case, the output luminance value of the display 110 may include at least one of a maximum brightness value of the contents, a maximum color value thereof, and an average brightness value thereof.

In addition, the display attributes may include at least one of a driving brightness that influences on a physical brightness of the display 110 and attribute information of the contents to be displayed.

In addition, the attribute information of the contents may include at least one of color information of at least one of an image and a text, brightness information of at least one of the image and the text, and an arrangement state of an object configuring at least one of the image and the text.

In addition, the brightness information of the contents may include at least one of luminance of at least one object included in the screen displaying the contents, an area of the object, and a luminance difference between the object and an adjacent object. In this case, the at least one object may be an object having the maximum luminance value among objects included in the screen, but is not limited thereto. For example, the object having the maximum luminance value among the objects included in the screen as well as an object having the next highest luminance value may be references that determine the display attribute of the contents.

Meanwhile, the processor 130 may adjust the output luminance value of the display 110 in a gradually increased form based on at least one of a predetermined mathematical time function, a brightness value stored in a lookup table (LUT), intensity synthesizing an image to be displayed and an image which is darker than the image to be displayed, and a memory value recorded previously in a device driver IC.

The processor 130 may determine a luminance adjustment factor of the display based on the ambient illuminance sensed by the sensing unit 120 and the display attributes, and adjust the luminance value of the display 110 in a gradually increased form based on the determined factor. For example, the processor 130 may adjust the output luminance value of the display 110 in a gradually increased form on a black screen.

Specifically, the processor 130 may determine at least one of starting luminance values, targeting luminance values, and luminance variation times based on the sensed ambient illuminance and display attributes, and adjust the luminance value of the display 110 based on the determined value. However, the at least one of the starting luminance values, the targeting luminance values, and the luminance variation times may be implemented to be changeable according to a user setting.

In addition, the processor 130 may adjust the output luminance value of the display 110 in a gradually increased form from the determined starting luminance value to the targeting luminance value during the determined luminance variation time.

As an example, a case in which the display 110 is implemented as an LCD panel will be described. In general, the LCD panel has an operation principal of generating a contrast and displaying an image by injecting a liquid crystal material, which is an intermediate material of solid and liquid, between two thin glass plates which are specially surface-treated and changing an arrangement of liquid crystal molecules by a voltage difference of an electrode between upper and lower glass plates. In this case, since the LCD panel does not emit light by itself, the LCD panel requires a light source in order to visually recognize the displayed contents. That is, by using a lamp as the light source and illuminating the lamp behind the LCD panel, the user may view the image displayed on the screen.

Accordingly, the processor 130 may determine a lamp supply voltage control value for controlling a lamp driver based on a value pre-stored to drive the lamp to provide the determined starting luminance value, and may provide the determined targeting luminance value by gradually increasing the lamp supply voltage control value.

For example, the lamp driver may include a voltage control signal generator, a converter, and an inverter. In this case, the voltage control signal generator generates a voltage control signal to control power supplied from a power source in response to the lamp supply voltage control value transmitted from the processor 130, and transmits the voltage control signal to the converter. The converter adjusts an output voltage of the power source in response to the lamp supply voltage control value in the voltage control signal transmitted from the voltage control signal generator. The inverter converts a DC voltage transmitted from the converter into an AC voltage, and supplies the AC voltage to a RAM. Such a lamp driver may control the converter 152 by dividing the steps according the value transmitted from the processor 130 to control brightness of the lamp accordingly. However, this is merely one example, and the method for adjusting the luminance may be performed by various methods according to implementation forms of the display 110.

In addition, the processor 130 may adjust the output luminance value of the display based on the display attributes of the contents displayed according to a predetermined event, in a state in which the sensed ambient illuminance is a predetermined illuminance or less. That is, the processor 130 may perform the luminance adjustment function according to the present disclosure only in the case in which the ambient illuminance is the predetermined illuminance according to an exemplary embodiment. However, the processor 130 is not limited thereto, and according to another exemplary embodiment, the processor 130 may perform the luminance adjustment function even in a case in which the ambient illuminance exceeds the predetermined illuminance, and this will be described with reference to a flowchart of FIG. 8.

In addition, the processor 130 may provide a UI screen for adjusting the output luminance value of the display according to the predetermined event onto one region of the display. Accordingly, the user may also manually adjust the output luminance value of the display through the UI screen. In this case, the processor 130 may also provide a GUI representing an original luminance value of the corresponding contents onto the UI screen. Accordingly, the user may appropriately adjust the output luminance value of the display through the corresponding GUI.

Figure 2B:
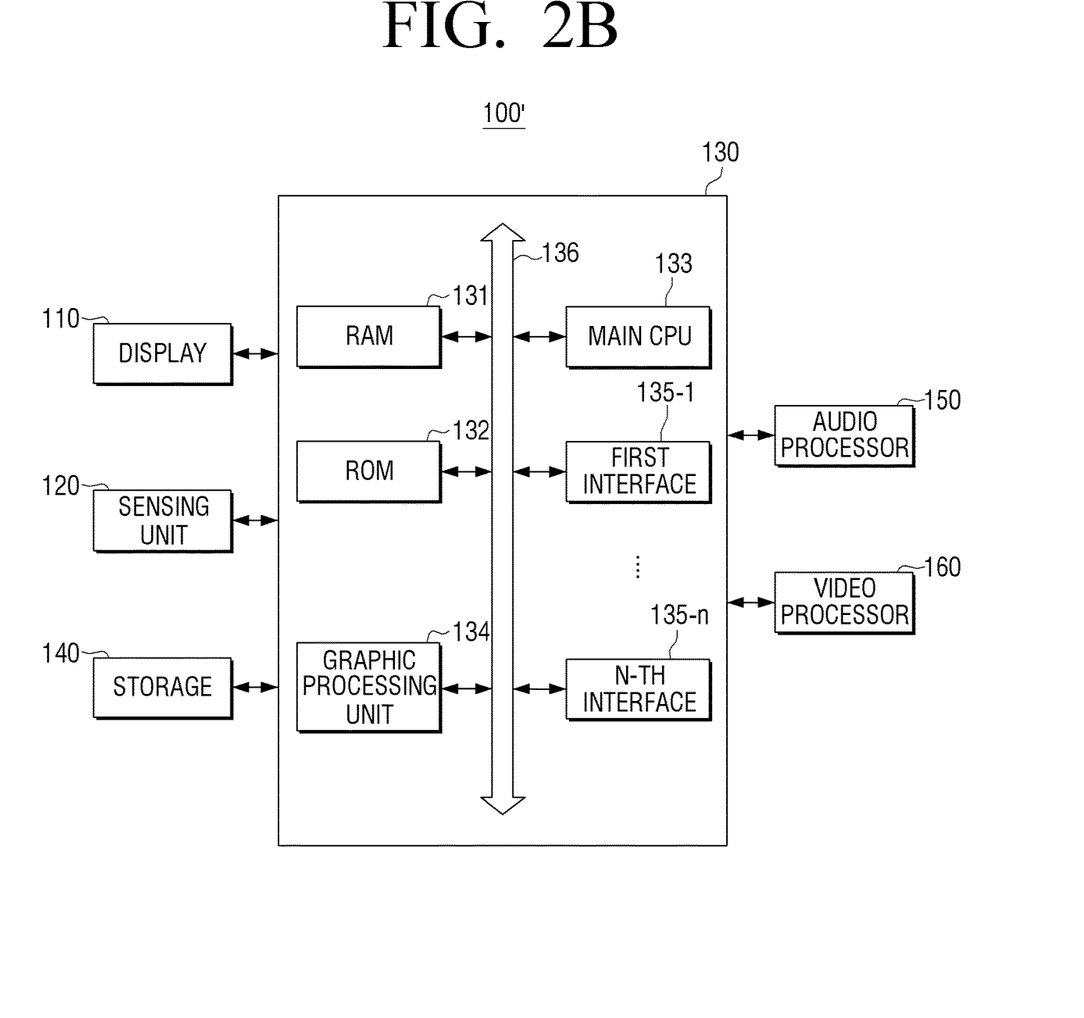
FIG. 2B is a block diagram illustrating a detailed configuration of the display device illustrated in FIG. 2A.

FIG. 2B is a block diagram illustrating a detailed configuration of the display device illustrated in FIG. 2A.

Referring to FIG. 2B, a display device 100' includes the display 120, the sensing unit 120, the processor 130, the storage 140, an audio processor 150, and a video processor 160. A detailed description of the components overlapped with the components shown in FIG. 2A among the components shown in FIG. 2B will be omitted.

The processor 130 includes a random access memory (RAM) 131, a read-only memory (ROM) 132, a main central processing unit (CPU) 133, a graphic processing unit 134, first to n-th interfaces 135-1 to 135-n, and a bus 136.

The RAM 131, the ROM 132, the main CPU 133, the graphic processing unit 134, the first to n-th interfaces 135-1 to 135-*n*, and the like may be connected to each other through the bus 136.

The first to n-th interfaces 135-1 to 135-*n* are connected to the variety of components described above. One of the interfaces may be a network interface connected to an external device via a network.

The main CPU 133 accesses the storage 140 and performs a booting operation using an operating system (O/S) stored in the storage 140. In addition, the main CPU 133 performs various operations using a variety of programs, contents, data, and the like stored in the storage 140.

The ROM 132 stores a set of instructions for booting a system, and the like. When a turn-on instruction is input to the main CPU 133 to supply power to the main CPU 133, the main CPU 133 copies the O/S stored in the storage 140 in the RAM 131 according to the instructions stored in the ROM 132, and executes the O/S to boot the system. When the booting operation is completed, the CPU 133 copies a variety of programs stored in the storage 140 in the RAM 131, and executes the programs copied in the RAM 131 to perform a variety of operations.

The graphics processing unit 134 generates a screen including various objects such as an icon, an image, a text, and the like using a calculator (not shown) and a renderer (not shown). The calculator (not shown) calculates attribute values such as coordinate values, shapes, sizes, colors, and the like in which the respective objects are to be displayed according to a layout of the screen based on a received control instruction. The renderer (not shown) generates the screen of various layouts including the objects based on the attribute values calculated by the calculator (not shown).

Meanwhile, the operations of the processor 130 described above may be performed by the program stored in the storage 140.

The storage 140 stores an operating system (O/S) software module for driving a broadcasting receiver 200 and various data such as a variety of multimedia contents. In particular, the storage 140 may store programs such as an illuminance calculating module, a contents characteristic determining module, a luminance adjusting module, and the like, and luminance information according to illuminance and contents characteristics.

Hereinafter, a detailed operation of the processor 130 using the programs stored in the storage 140 will be described in detail.

Figure 3:
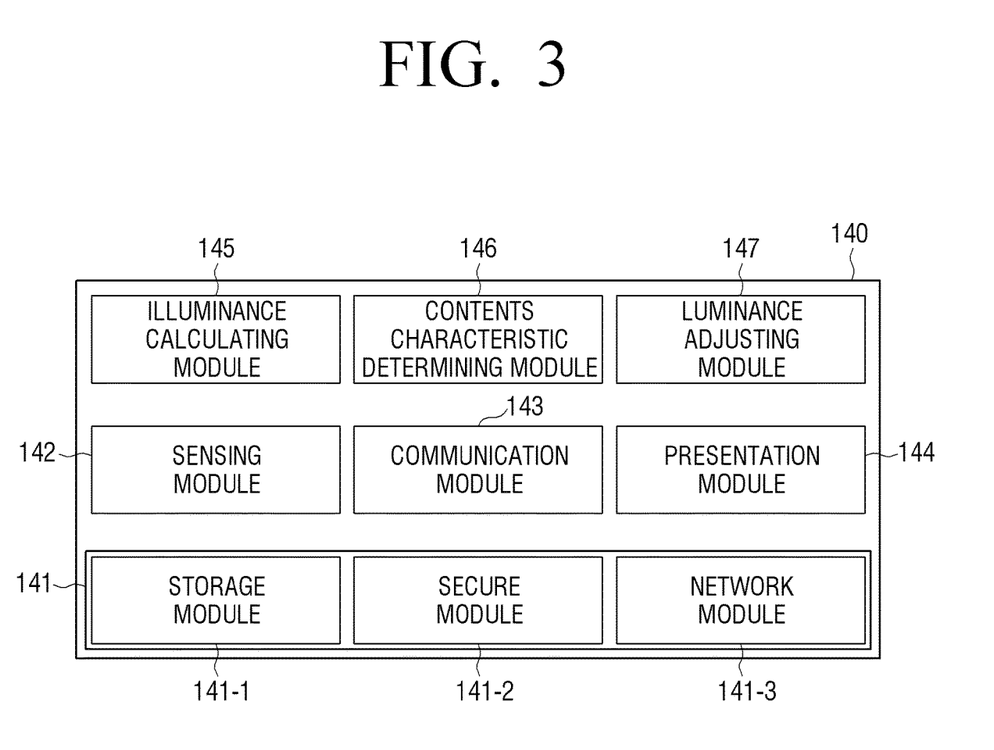
FIG. 3 is a diagram illustrating various modules stored in a storage.

FIG. 3 is a diagram illustrating various modules stored in a storage.

Referring to FIG. 3, the storage 140 may store software including a base module 141, a sensing module 142, a communication module 143, a presentation module 144, an illuminance calculating module 145, a contents characteristics determining module 146, and a luminance adjusting module 147.

The base module 141 means a basic module processing signals transferred from the respective hardware included in the display device 100' and transferring the processed signals to a high layer module. The base module 141 includes a storage module 141-1 that manages a database (DB) or a registry, a secure module 141-2 that supports certification, permission, and secure storage for hardware, and a network module 141-3 that supports a network connection.

The sensing module 142 is a module collecting information from a variety of sensors, and analyzing and managing the collected information. The sensing module 142 may also include a illuminance recognition module, a touch recognition module, a head direction recognition module, a face recognition module, a voice recognition module, a motion recognition module, an NFC recognition module, and the like.

The communication module 143 is a module for performing communication with the outside. The communication module 143 may include a device module used for communicating with an external device, a messaging module such as a messenger program, a short message service (SMS) & multimedia message service (MMS) program, an e-mail program, and the like, and a call module including a call info aggregator program module, a VoIP module, and the like.

The presentation module 144 is a module for configuring a display screen. The presentation module 144 may include a multimedia module for reproducing and outputting multimedia contents and a UI rendering module performing a UI and graphic processing.

The illuminance calculating module 145 is a module for calculating illuminance information according to the illuminance signal sensed by the sensing unit 120. To this end, the illuminance calculating module 145 may include a predetermined algorithm for converting the sensed illuminance signal into the illuminance information which may be determined by the processor 130.

The contents characteristic determining module 146 may determine the display attribute of the contents displayed on the screen, that is, at least one of luminance of at least one object included in the screen displaying the contents, an area of the corresponding object, a luminance difference of the corresponding object and an adjacent object, and a color of the corresponding object. To this end, the contents characteristic determining module 146 may include an algorithm for obtaining a variety of information associated with at least one object included in a frame.

The luminance adjusting module 147 is a module for adjusting the output luminance value of the display based on the ambient illuminance calculated by the illuminance calculating module 145 and the display attributes of the contents determined by the contents characteristic determining module 146. To this end, the luminance adjusting module 147 may include a variety of data and algorithms for determining a luminance adjustment factor based on the ambient illuminance and the display attributes of the contents. However, in the case of a specific applications (e.g., a call application, an SMS application, and the like), since most of the screens provided by the corresponding application have the same display attribute, the output luminance value of the display may also be adjusted according to the adjustment factor which is predetermined for each of the applications.

In this case, the processor 130 may adjust the output luminance value of the display using the illuminance calculating module 145, the contents characteristic determining module 146 and the luminance adjusting module 147 according to an exemplary embodiment of the present disclosure.

Besides, the display device 100' may further include the audio processor 150 that performs a processing for audio data, the video processor 160 that performs a processing for video data, a speaker (not shown) that outputs a variety of audio data processed by the audio processor 150 as well as a variety of alarms or voice messages, a microphone (not shown) for receiving a user voice or other sounds and converting it into the audio data, and the like.

Figure 4:
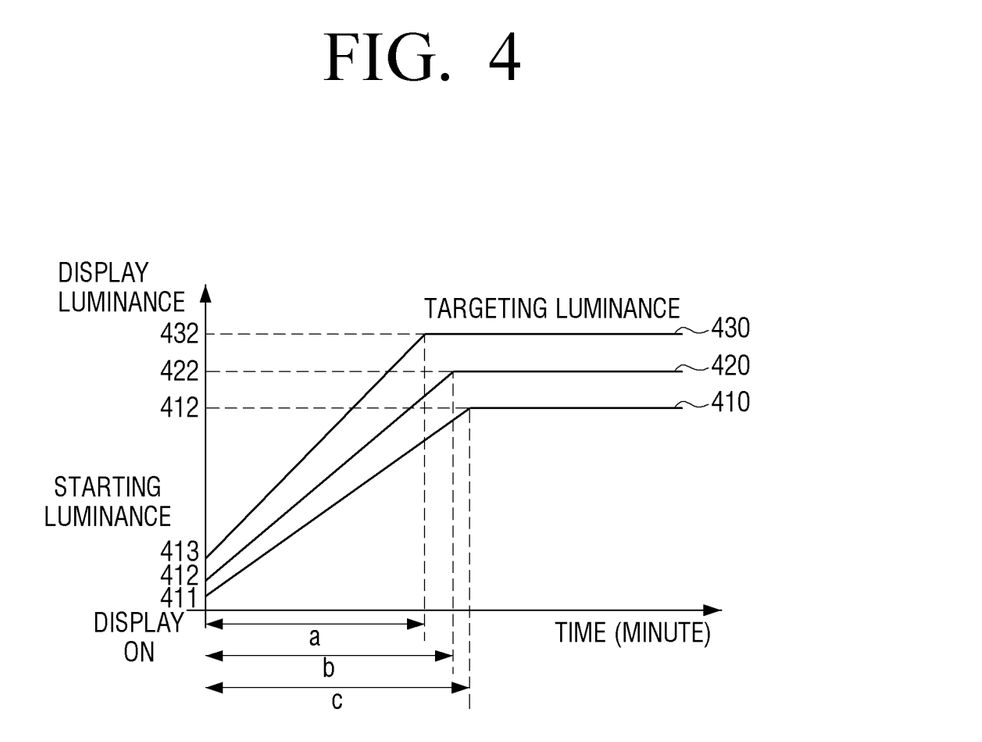
FIG. 4 is a graph illustrating a method for adjusting luminance of a display according to an exemplary embodiment of the present disclosure.

FIG. 4 is a graph illustrating a method for adjusting luminance of a display according to an exemplary embodiment of the present disclosure.

Referring to FIG. 4, at least one of the starting luminance values, the targeting luminance values, and the luminance variation times may be variably determined according to the ambient illuminance and the display attributes of the contents.

For example, the starting luminance values 411 to 413, the targeting luminance values 421 to 423, and the luminance variation times a to c may be variably determined according to the ambient illuminance and the display attributes of the contents as illustrated, and graphs 410 to 430 that represent the output luminance value of the display over time according to the variably determined value may be variably represented as illustrated. However, the illustrated exemplary embodiment illustrates a form in which the luminance value is linearly increased, but this is merely one example, and the luminance value also be increased in a form of step wave.

Figure 5A:
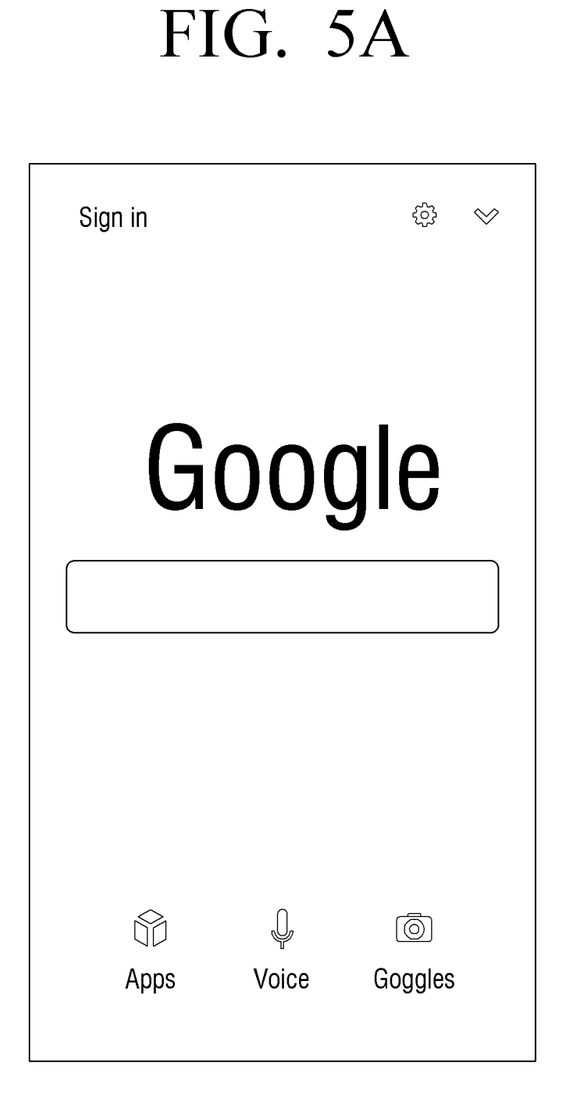
FIGS. 5A and 5B are diagrams illustrating display attributes of contents according to diverse exemplary embodiments of the present disclosure.
Figure 5B:
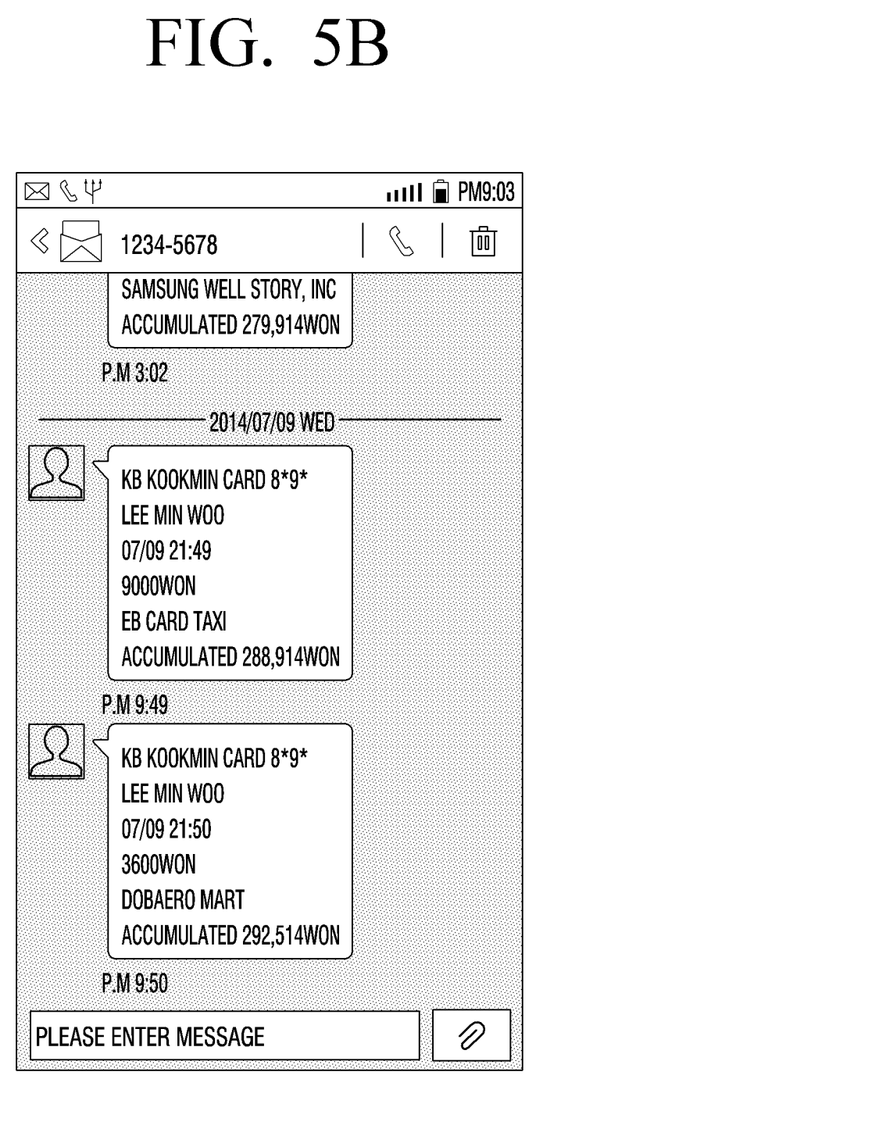

FIGS. 5A and 5B are diagrams illustrating display attributes of contents according to diverse exemplary embodiments of the present disclosure.

According to an exemplary embodiment of the present disclosure, a glariness phenomenon may occur in different degrees even at the same luminance according to the display attributes of the contents.

For example, as compared with a case of contents which are entirely bright as illustrated in FIG. 5A and a case in which contents of a bright color having high brightness are displayed on a dark background as illustrated in FIG. 5B, the case of FIG. 5B is likely to cause the glariness phenomenon even at lower luminance. Accordingly, the case of FIG. 5B may set the starting luminance value to be lower than the case of FIG. 5A.

Figure 6A:
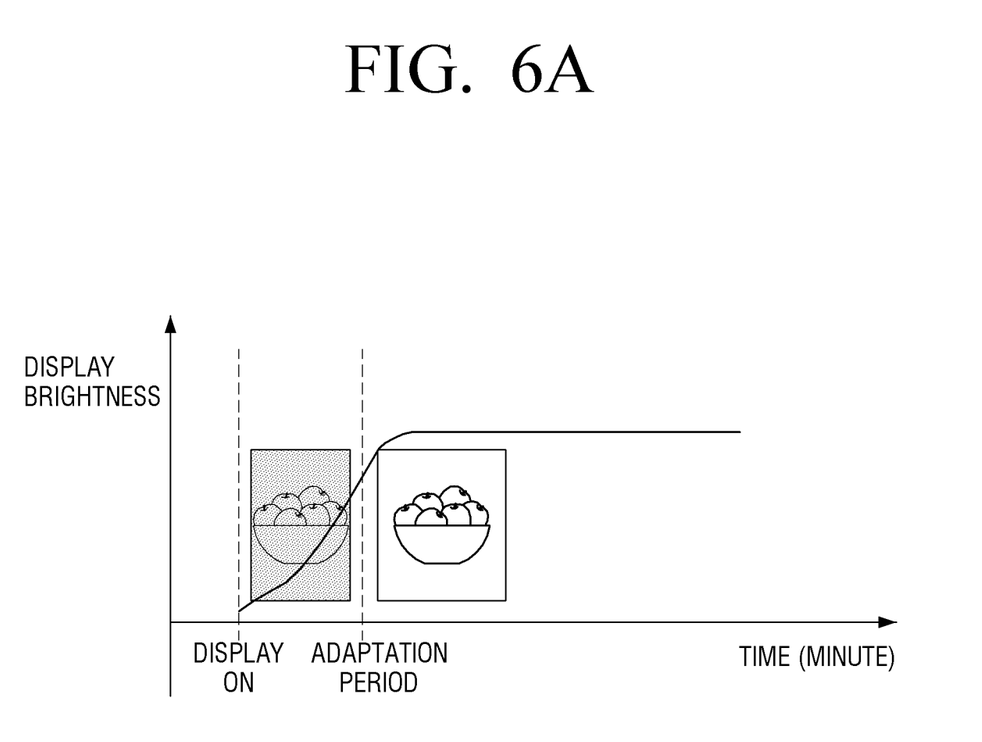
FIGS. 6A and 6B are diagrams illustrating visual brightness according to an exemplary embodiment of the present disclosure.
Figure 6B:
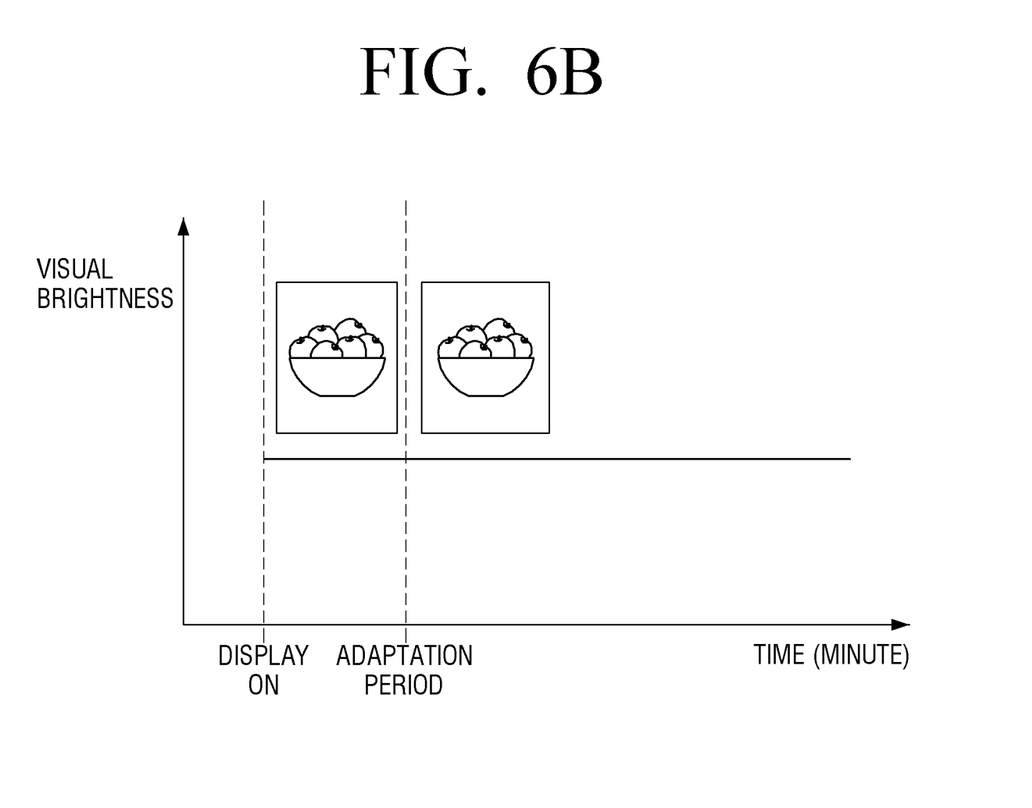

FIGS. 6A and 6B are diagrams illustrating visual brightness according to an exemplary embodiment of the present disclosure.

As illustrated in FIG. 6A, when the output luminance value of the display is gradually increased according to an exemplary embodiment of the present disclosure, since a visual brightness is constantly maintained, the eye is not glared or a fatigue is not accumulated as compared to the prior art illustrated in FIGS. 1A and 1B.

Figure 7:
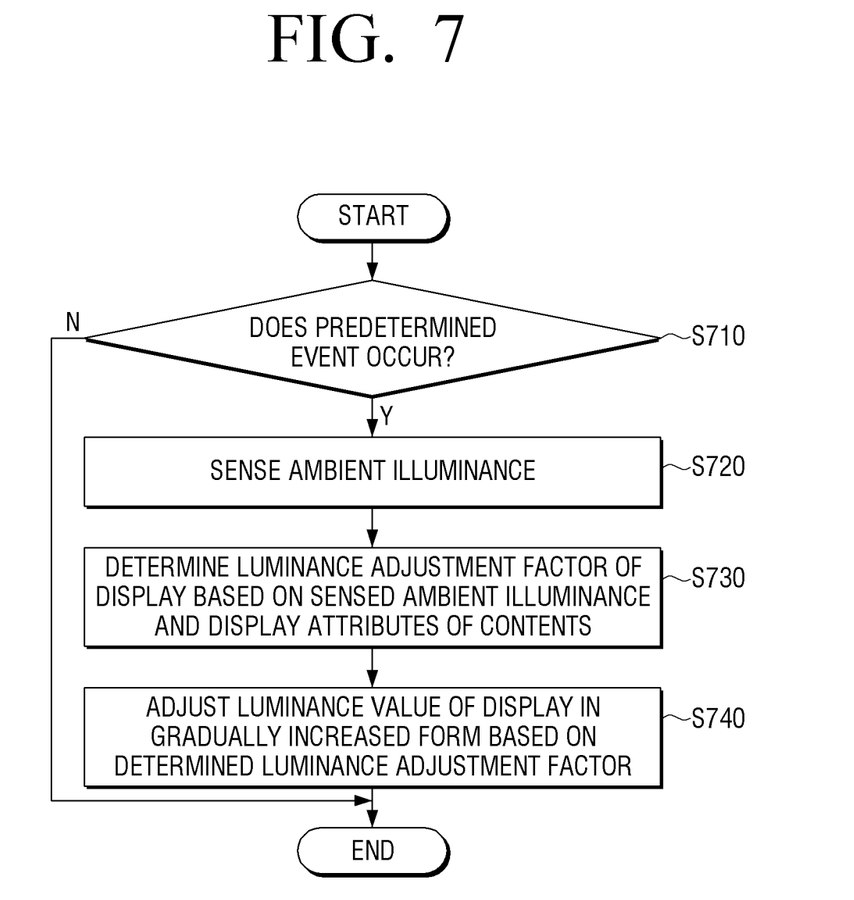
FIG. 7 is a flowchart illustrating a control method of a display device according to an exemplary embodiment of the present disclosure.

FIG. 7 is a flowchart illustrating a control method of a display device according to an exemplary embodiment of the present disclosure.

According to the control method of the display device illustrated in FIG. 7, if a predetermined event occurs (Yes in S710), ambient illuminance is sensed (S720). Here, the predetermined event may be an event in which the screen of the display is changed from an inactive state to an active state, but is not limited thereto.

A luminance adjustment factor of the display is then determined based on the sensed ambient illuminance and display attributes (S730).

The output luminance value of the display is then adjusted in a gradually increased form based on the determined luminance adjustment factor (S740).

Here, the display attributes may include at least one of a driving brightness of the display and attribute information of an image and a text configuring the contents to be displayed, and the attribute information of the contents may include at least one of color information of the image and the text configuring the contents, brightness information of the image and the text configuring the contents, and an arrangement state of objects configuring the image and the text configuring the contents.

In addition, the brightness information of the contents may include at least one of luminance of at least one object included in the screen displaying the contents, an area of the object, and a luminance difference between the object and an adjacent object. In this case, the at least one object may be an object having the maximum luminance value among objects included in the screen.

In this case, in the operation (S830) of determining the luminance adjustment factor of the display, at least one of starting luminance values, targeting luminance values and luminance variation times may be determined based on the sensed ambient illuminance and display attributes.

In addition, in the operation (S840) of adjusting the output luminance value of the display, the output luminance value of the display may be adjusted in a gradually increased form from the determined starting luminance value to the targeting luminance value during the determined luminance variation time.

In addition, the display attributes of the contents may further include a color of at least one object.

Meanwhile, in the operation (S840) of adjusting the output luminance value of the display, if the sensed ambient illuminance is a predetermined illuminance or less, the output luminance value of the display may be adjusted based on the display attributes.

In addition, the control method of the display device may further include providing a UI screen for adjusting the output luminance value of the display according to the predetermined event onto one region of the display. In this case, a GUI representing an original luminance value of the contents on the UI screen to guide the luminance adjustment of the user may be provided.

Figure 8:
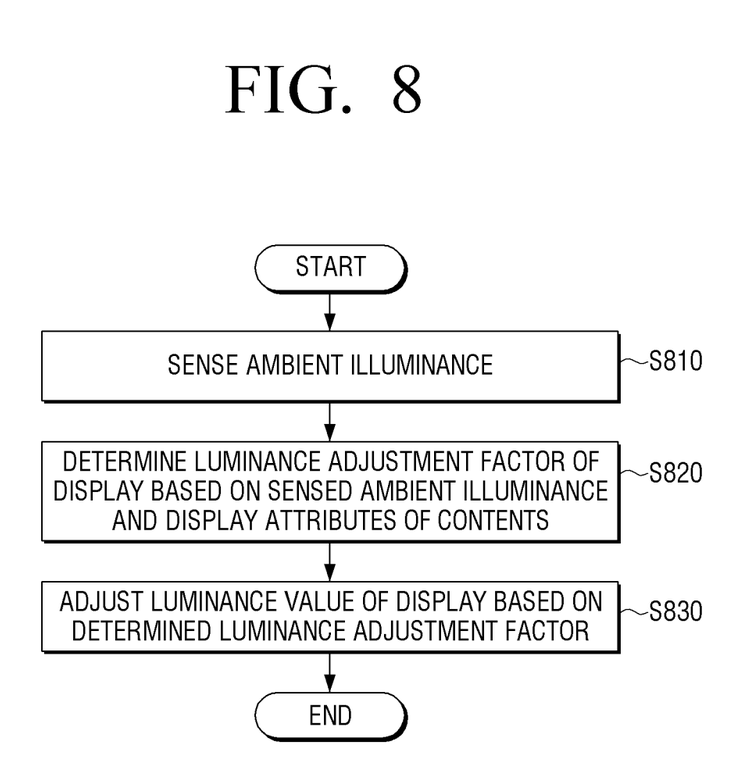
FIG. 8 is a flowchart illustrating a control method of a display device according to another exemplary embodiment of the present disclosure.

FIG. 8 is a flowchart illustrating a control method of a display device according to another exemplary embodiment of the present disclosure.

According to the control method of the display device according to another exemplary embodiment of the present disclosure illustrated in FIG. 8, ambient illuminance is first sensed (S810). In this case, the display device may sense the ambient illuminance periodically or at the time of occurrence of a predetermined event (e.g., a position change, an event according to a predetermined time arrival). For example, the display device may periodically sense the ambient illuminance after 9 p.m.

A luminance adjustment factor of the display is then determined based on the sensed ambient illuminance and display attributes of the contents (S820).

An output luminance value of the display is then adjusted based on the determined luminance adjustment factor (S830).

Specifically, in the operation (S820) of determining the luminance adjustment factor, the targeting luminance values and the luminance variation times may be determined in consideration of a current output luminance value of the display. For example, as described in FIG. 7, even though there is no event that the screen is changed from the inactive state to the active state, the luminance value of the screen may be adjusted to an appropriate value based on the ambient illuminance and the display attributes of the contents.

As described above, according to the diverse exemplary embodiments of the present disclosure, in a case in which a mobile device is used in a nighttime or dark environment, since it is possible to reflect visual compliance characteristics according to the ambient illuminance as well as contents characteristics, thereby making it possible to prevent the glariness phenomenon.

Meanwhile, the methods according to the diverse exemplary embodiments described above may be programmed and stored in a variety of storage mediums. Accordingly, the methods according to the diverse exemplary embodiments described above may be implemented in various types of electronic devices executing the storage mediums.

Specifically, according to an exemplary embodiment of the present disclosure, a non-transitory computer readable medium having a program stored thereon may be provided, where the program sequentially performs an operation of sensing ambient illuminance when a predetermined event occurs, an operation of determining a luminance adjustment factor of the display based on the sensed ambient illuminance and display attributes of the contents, and an operation of adjusting an output luminance value of the display in a gradually increased form based on the determined luminance adjustment factor.

The non-transitory computer readable medium does not mean a medium that stores data for a short period such as a register, a cache, a memory, or the like, but means a machine readable medium that semi-permanently stores the data. Specifically, various applications or programs described above may be stored and provided in the non-transitory computer readable medium such as a compact disc (CD), a digital versatile disk (DVD), a hard disk, a Blu-ray disk, a universal serial bus (USB), a memory card, a read-only memory (ROM), or the like.

In addition, although exemplary embodiments of the present disclosure have been illustrated and described hereinabove, the present disclosure is not limited to the above-mentioned specific exemplary embodiments, but may be variously modified by those skilled in the art to which the present disclosure pertains without departing from the scope and spirit of the present disclosure as disclosed in the accompanying claims. These modifications should not be separately understood from the technical spirit and scope of the present disclosure.

The invention claimed is:

1. A display device comprising:
 a display;
 a sensor; and
 a processor configured to:
  control the display to display a content,
  obtain a display attribute of the content based on an arrangement of objects configuring the content by only using an object having a maximum luminance value among the objects and an object having a next highest luminance value among the objects,
  based on ambient illuminance sensed by the sensor and the display attribute, gradually increase an output luminance value of the display,
 wherein the processor is further configured to gradually increase the output luminance value of the display from a starting luminance value to a targeting luminance value during a luminance variation time, and
 wherein the processor is further configured to variably determine the starting luminance value based on a luminance difference between one object of objects in a frame included in the content and an adjacent object of the one object in the frame.

2. The display device as claimed in claim 1, wherein the processor gradually increases the output luminance value of the display based on the output luminance value of the display being higher than the ambient illuminance or the display being changed from an inactive state to an active state.

3. The display device as claimed in claim 1, wherein the display attribute further includes a driving brightness of the display and color information of the content.

4. The display device as claimed in claim 1, wherein the processor adjusts the output luminance value of the display in a gradually increased form over time based on at least one of a predetermined mathematical time function, a brightness value stored in a lookup table (LUT) or registry, intensity of synthesizing the content and an image which is darker than the content, and a memory value recorded previously in a device driver IC.

5. The display device as claimed in claim 1, wherein the output luminance value of the display includes at least one of a maximum brightness value of content and an average brightness value of the content.

6. The display device as claimed in claim 1, wherein the processor identifies the starting luminance value based on the sensed ambient illuminance and the display attribute.

7. The display device as claimed in claim 1, wherein the processor provides a user interface (UI) screen for adjusting the output luminance value of the display according to a predetermined event onto one region of the display.

8. A control method of a display device, the control method comprising:
 displaying a content,
 sensing ambient illuminance;
 obtaining a display attribute of the content based on an arrangement state of objects configuring the content by only using an object having a maximum luminance value among the objects and an object having a next highest luminance value among the objects; and
 based on the sensed ambient illuminance and the display attribute, adjusting an output luminance value of the display in a gradually increased form,
 wherein the adjusting comprises gradually increasing the output luminance value of the display from a starting luminance value to a targeting luminance value during a luminance variation time, and
 wherein the starting luminance value is variably determined based on a luminance difference between one object of objects in a frame included in the content and an adjacent object of the one object in the frame.

9. The control method as claimed in claim 8, wherein the increasing the output luminance value of the display is performed based on the output luminance value of the display being higher than the ambient illuminance or the display being changed from an inactive state to an active state.

10. The control method as claimed in claim 8, wherein the display attribute further includes a driving brightness of the display and color information of the content.

* * * * *